United States Patent [19]
Kane et al.

[11] Patent Number: 5,957,531
[45] Date of Patent: Sep. 28, 1999

[54] CHILD CAR SEAT

[75] Inventors: Michael T. Kane, East Aurora; Peter J. Kelch, Greece, both of N.Y.

[73] Assignee: Fisher Price Inc., East Aurora, N.Y.

[21] Appl. No.: 08/738,052

[22] Filed: Oct. 25, 1996

[51] Int. Cl.⁶ .................................................. B60N 2/28
[52] U.S. Cl. ................... 297/256.14; 297/250.1; 297/452.2; 116/200
[58] Field of Search ................... 297/250.1, 256.14, 297/452.2; 116/200

[56] References Cited

U.S. PATENT DOCUMENTS

| | | |
|---|---|---|
| D. 286,470 | 11/1986 | Takada . |
| D. 303,878 | 10/1989 | Goldsmith . |
| D. 311,281 | 10/1990 | Meeker . |
| 3,136,579 | 6/1964 | Hunter ................................. 297/250 |
| 3,534,704 | 10/1970 | Eckhardt ............................ 116/200 |
| 3,583,761 | 6/1971 | Hume . |
| 3,669,279 | 6/1972 | Burgard et al. ........................ 211/41 |
| 3,709,558 | 1/1973 | Jakob . |
| 3,762,768 | 10/1973 | Hyde et al. . |
| 3,779,599 | 12/1973 | Gottfried . |
| 3,791,694 | 2/1974 | Roberts et al. . |
| 3,872,567 | 3/1975 | Cea et al. ........................ 29/203 MW |
| 3,910,634 | 10/1975 | Morris . |
| 3,922,035 | 11/1975 | Wener . |
| 3,934,934 | 1/1976 | Farrell . |
| 3,938,859 | 2/1976 | Henderson et al. . |
| 3,976,328 | 8/1976 | Stahel . |
| 3,992,028 | 11/1976 | Abe et al. . |
| 3,992,056 | 11/1976 | Koziatek et al. . |
| 4,025,111 | 5/1977 | Tanaka et al. . |
| 4,033,622 | 7/1977 | Boudreau . |
| 4,047,755 | 9/1977 | McDonald et al. . |
| 4,113,306 | 9/1978 | von Wimmersperg . |
| 4,186,961 | 2/1980 | Farrell, Jr. et al. . |
| 4,186,962 | 2/1980 | Meeker . |
| 4,190,288 | 2/1980 | Korger . |
| 4,219,021 | 8/1980 | Fink ...................................... 128/214 |
| 4,231,612 | 11/1980 | Meeker . |
| 4,339,149 | 7/1982 | Nakao et al. . |
| 4,342,483 | 8/1982 | Takada . |
| 4,343,510 | 8/1982 | Cone . |
| 4,345,791 | 8/1982 | Bryans et al. . |
| 4,376,551 | 3/1983 | Cone . |
| 4,402,548 | 9/1983 | Mason . |
| 4,436,341 | 3/1984 | Converse . |
| 4,480,870 | 11/1984 | von Wimmersperg . |

(List continued on next page.)

FOREIGN PATENT DOCUMENTS

| | | |
|---|---|---|
| 0 462 930 | 12/1991 | European Pat. Off. . |
| 0 656 285 | 6/1995 | European Pat. Off. . |
| 0 558 499 | 3/1996 | European Pat. Off. . |
| 1200900 | 7/1959 | France ................................. 116/200 |
| 26411236 | 7/1990 | France ............................... 297/250.1 |
| 3536206 | 4/1987 | Germany .......................... 297/250.1 |
| 4031718 | 4/1992 | Germany .......................... 297/250.1 |
| 401004549 | 1/1989 | Japan ................................ 297/250.1 |
| 2143727 | 2/1985 | United Kingdom ............... 297/250.1 |

OTHER PUBLICATIONS

United Nations Economic Committee for Europe, ECE Reg 44.04–4. Markings, Oct. 16, 1995.

*Primary Examiner*—Peter M. Cuomo
*Assistant Examiner*—David E. Allred
*Attorney, Agent, or Firm*—Morgan, Lewis & Bockius LLP; C Scott Talbot

[57] ABSTRACT

A child restraining apparatus for mounting in a passenger seat of a vehicle is provided. In one embodiment, the child restraining apparatus has an improved vehicle seat belt pathway to accommodate vehicles having particularly forward or high seat belt anchor positions. The child restraining apparatus can also include easily identifiable seat belt pathways corresponding to the seat's forward seat-facing and rear seat-facing orientations and an adjustable harness with easily identifiable harness placements corresponding to the seat's forward facing and rearward facing orientations. In the forward facing orientation, the improved vehicle seat belt pathway generally provides an entry point for a vehicle seat that is disposed forward of, and above, the seating surface of the child car seat.

9 Claims, 17 Drawing Sheets

U.S. PATENT DOCUMENTS

| | | |
|---|---|---|
| 4,500,133 | 2/1985 | Nakao et al. . |
| 4,506,785 | 3/1985 | Seefeldt ................................. 206/334 |
| 4,545,613 | 10/1985 | Martel et al. . |
| 4,613,188 | 9/1986 | Tsuge et al. . |
| 4,620,711 | 11/1986 | Dick . |
| 4,627,659 | 12/1986 | Hall . |
| 4,634,185 | 1/1987 | Kassai . |
| 4,660,889 | 4/1987 | Anthony et al. . |
| 4,662,683 | 5/1987 | Knoedler et al. . |
| 4,685,741 | 8/1987 | Tsuge et al. . |
| 4,707,024 | 11/1987 | Schräder . |
| 4,718,722 | 1/1988 | Kassai . |
| 4,729,600 | 3/1988 | Single, II et al. . |
| 4,754,999 | 7/1988 | Kain . |
| 4,768,828 | 9/1988 | Kohketsu . |
| 4,826,246 | 5/1989 | Meeker . |
| 4,880,277 | 11/1989 | Takahashi et al. . |
| 4,886,315 | 12/1989 | Johnson . |
| 5,052,750 | 10/1991 | Takahashi et al. ............. 297/256.16 X |
| 5,082,325 | 1/1992 | Sedlack . |
| 5,292,176 | 3/1994 | Artz ..................................... 297/250.1 |
| 5,294,185 | 3/1994 | Koyanagi . |
| 5,366,371 | 11/1994 | Johnston et al. . |
| 5,458,398 | 10/1995 | Meeker . |
| 5,468,047 | 11/1995 | Goor et al. ........................... 297/250.1 |
| 5,518,293 | 5/1996 | Coy . |
| 5,527,094 | 6/1996 | Hiramatsu et al. .................. 297/250.1 |

CHILD CAR SEAT

The present invention relates broadly to a child car seat for the protection and restraint of a child or infant while in a vehicle. More specifically, the invention relates to a convertible car seat having color-coded features to more clearly identify and distinguish the proper harness adjustments and vehicle seat belt pathways corresponding to the rear-facing and forward-facing seat orientations. Additionally, the present invention relates to a convertible car seat having an improved harness adjustment mechanism and a unique structure which permits the child car seat of the present invention to be used with different vehicles having a wide range of seat belt configurations, including forward- and high-anchor buckle positions.

BACKGROUND OF THE INVENTION

Vehicles, such as cars, are presently equipped with occupant restraining seat belts installed by the manufacturers of the cars. While such seat belts are adequate for restraining adults in the event of a sudden stop, collision or other emergency, most are inadequate for protecting small children and infants. As a result, a variety of specially designed child restraint devices have been designed and developed and are in widespread use today. Child car seats are indeed required by all states as a matter of law for use with infants and children who are of such size that a standard vehicle seat belt does not afford adequate protection. Conventional child car seats typically utilize the vehicle seat belt provided by the vehicle manufacturer to secure the child seat to the vehicle.

Most vehicles today come equipped with a three-point seat belt system, which is either formed from a lap belt and a shoulder harness joined together in a non-movable latch plate or one continuous belt having a movable or dropping latch plate separating the lap belt portion from the shoulder harness portion. In either configuration, the latch plate is coupled together at one end for releasable securement by the wearer to a buckle at a first fixed point on the car seat adjacent the wearer. The lower belt is the horizontal lap belt extending over the wearer's lap to an adjacent second fixed point. The second or shoulder belt extends transversely from the buckle or anchor, angling upwardly across the wearer's chest and shoulder, to an elevated fixed third point.

To promote compatibility between child restraint systems and vehicle seats and seat belts, the SAE (Society of Automotive Engineers) publishes design guidelines which it provides to vehicle manufacturers as well as child restraint system ("CRS") manufacturers. For example, SAE Standard J1819, directed to securing child restraint systems in motor vehicles, is designed to ensure that a tight interface between a CRS and a vehicle seat exists regardless of the position of the seat belt anchor. This standard recommends to vehicle manufacturers that the buckle-latch plate assembled length shall be such that the end of the latch plate is within a circular segment having a radius of eight inches (20 cm) from the seat bight (the intersection of the seat back and the seat bottom or seat pan) in order to minimize the forward movement of a fixture resembling a CRS. The seat belt anchor generally consists of a stiff shank or piece of webbing having a buckle at its free end. The latch plate is located on the seat belt and when fastened, joins the lap belt and/or shoulder harness to the seat belt anchor.

Standard J1819 further recommends to CRS manufacturers that the CRS have an entry position (for the vehicle seat belt assembly) which is at least eight inches (20 cm) from the bight of the seat when the CRS is installed. This eight inch (20 cm) radius ensures that the vehicle buckle assembly would not rest on the entry point of the CRS. Unfortunately, SAE Standard J1819 is voluntary and there are a number of vehicles and seating positions that are not compatible with conventional CRSs due to high vehicle buckle heights and/or forward anchor positions.

In many vehicles, the buckle or anchor is indeed located very near the seat bight, and thus can accommodate a conventional car seat having a belt pathway located either directly in back of or underneath the child. See, for example, U.S. Design Pat. No. 311,281; U.S. Design Pat. No. 286,470 and U.S. Pat. No. 4,886,315. With vehicles having this type of seat belt configuration, when the vehicle seat belt is threaded through a conventional car seat and fastened to the buckle or anchor, the car seat is properly positioned firmly against the vehicle seat bottom and seat back giving a secure retention.

In some newer model vehicles, however, the buckle or anchor is located away from the seat bight, generally more forward and/or higher on the seat. Also, some vehicles have the anchor or buckle extending upward from a shaft on the floor or side of the seat. While this new configuration may provide greater comfort for adult users of the seat belt, it is highly incompatible with the belt pathways in conventional child car seats. When used with a conventional child car seat, a two- or three-point seat belt system with a forward anchor configuration presents an unacceptable situation since the seat belt cannot fit the child car seat snugly to the vehicle. In other words, the forward anchor position allows a moderate degree of fore-aft translation between the vehicle seat back and a car seat having conventional belt pathways. Therefore, there exists a need for a child car seat equipped with a belt pathway to properly accommodate a variety of different seat belt configurations, including forward- and/or high-anchor configurations.

Moreover, a number of vehicles equipped with a three-point seat belt system incorporate a dropping or movable latch plate on the belt. This movable latch plate separates the lap belt portion from the shoulder harness portion of the seat belt and provides the necessary connection point to the buckle. When using a child car seat with a seat belt system incorporating a dropping latch plate and a shoulder reel equipped with an ELR (emergency locking retractor), the seat belt system cannot securely fasten the car seat to the vehicle and it has been heretofore necessary to use an additional locking clip to isolate the lap portion of the belt from the shoulder belt reel and ensure a snug fit between the child seat and the vehicle. The locking clip essentially locks the shoulder harness portion to the lap belt portion of the seat belt prior to engaging the child car seat to avoid any excess movement or play in the lap belt portion of the vehicle seat belt. Although critical, these clips are difficult to position and use effectively. Therefore, there exists a need to provide an improved system for securely fastening a child car seat to a vehicle equipped with ELR and having a three-point seat belt system with a dropping or movable latch plate.

Convertible child car seats, i.e. seats capable of being used in a rear-facing or forward facing orientation, are well known in the field. Depending on the desired orientation, the vehicle seat belt must generally be threaded through the child car seat in a different way to securely fasten the seat to the vehicle. See, for example, Kain, U.S. Pat. No. 4,764,999. The improper installation of a child car seat in a vehicle, in either orientation, is a very real possibility. Therefore, it would be advantageous to have a convertible child car seat which has more clearly identified and well-marked vehicle seat belt pathways through which a vehicle seat belt is passed to ensure a proper securement.

With respect to convertible child seats, it is a matter of law in all states that a child weighing less than 20 pounds (or generally one year of age) must be placed in a child car seat secured in a vehicle in a rear-facing, more reclined direction until their body develops sufficiently and can withstand the forces involved in a crash when forward facing. Once the child weighs more than 20 pounds, the child car seat can be placed in the vehicle in a forward-facing, more upright position. While children obviously grow at different rates, smaller children generally occupy the child car seat in its rear-facing position. Similarly, older and generally larger children usually occupy the child car seat in its forward-facing position. Since it is not economical to buy a new car seat every few months or years as the child grows, many manufacturers incorporate one or more adjustment mechanisms to permit the child seat to accommodate children of different sizes, as well as both orientations.

Since infants generally occupy the car seat in its rear-facing position, the harness adjustments necessary for an infant (i.e., a child under 20 pounds or one year of age) generally correspond to the rear-facing position. Similarly, toddlers generally occupy the seat in its forward-facing position, and thus the larger harness adjustments necessary for a toddler generally correspond to the forward-facing position. With conventional convertible car seats, the seat belt path recommended by the manufacturer may be very complex. Moreover, users may lose or not even bother to read the installation instructions, thereby resulting in an improperly installed car seat. It would be advantageous to have a convertible car seat that had easily identifiable and distinguishable belt pathways. It would also be advantageous to have a convertible car seat that had easily identifiable corresponding harness adjustments.

SUMMARY OF THE INVENTION

The needs identified above are met, and the shortcomings of prior art CRS designs overcome by the CRS of the present invention. In one aspect, the present invention provides a child car seat having an improved vehicle seat belt pathway which can accommodate a wide variety of seat belt configurations, including those having a forward or high anchor position. The belt pathway of the car seat of the present invention preferably includes a pair of tubes extending from the upper portion of the rear of the child seat, diagonally downward along the sides of the seat toward the front. In the forward facing seat orientation, the vehicle seat belt is passed over one tube, back behind the seat, out over the other tube, and then anchored into the buckle. Since the tubes are positioned such that the vehicle seat belt engages the seat forward of the back of the child car seat seating surface and above the bottom of the seating surface, the seat can be used with many different types of vehicles having a wide variety of seat belt configurations.

In another aspect, the present invention provides a convertible child car seat having color-coded features to more clearly identify and distinguish the appropriate harness adjustments and vehicle seat belt positions corresponding to either the forward facing or rearward facing seat orientation. The harness adjustments generally consist of multiple sets of slots arrayed vertically along the seat back for adjusting the height of the shoulder straps. The seat may also be fitted with a rear leg or kickstand to ensure the proper positioning of the car seat in the vehicle. The various adjustment mechanisms on the seat are color-coded to aid the parent in correctly fitting the seat to the car and the child to differentiate the differing adjustments required for rear-facing versus forward facing use.

DETAILED DESCRIPTION

Figure 1:
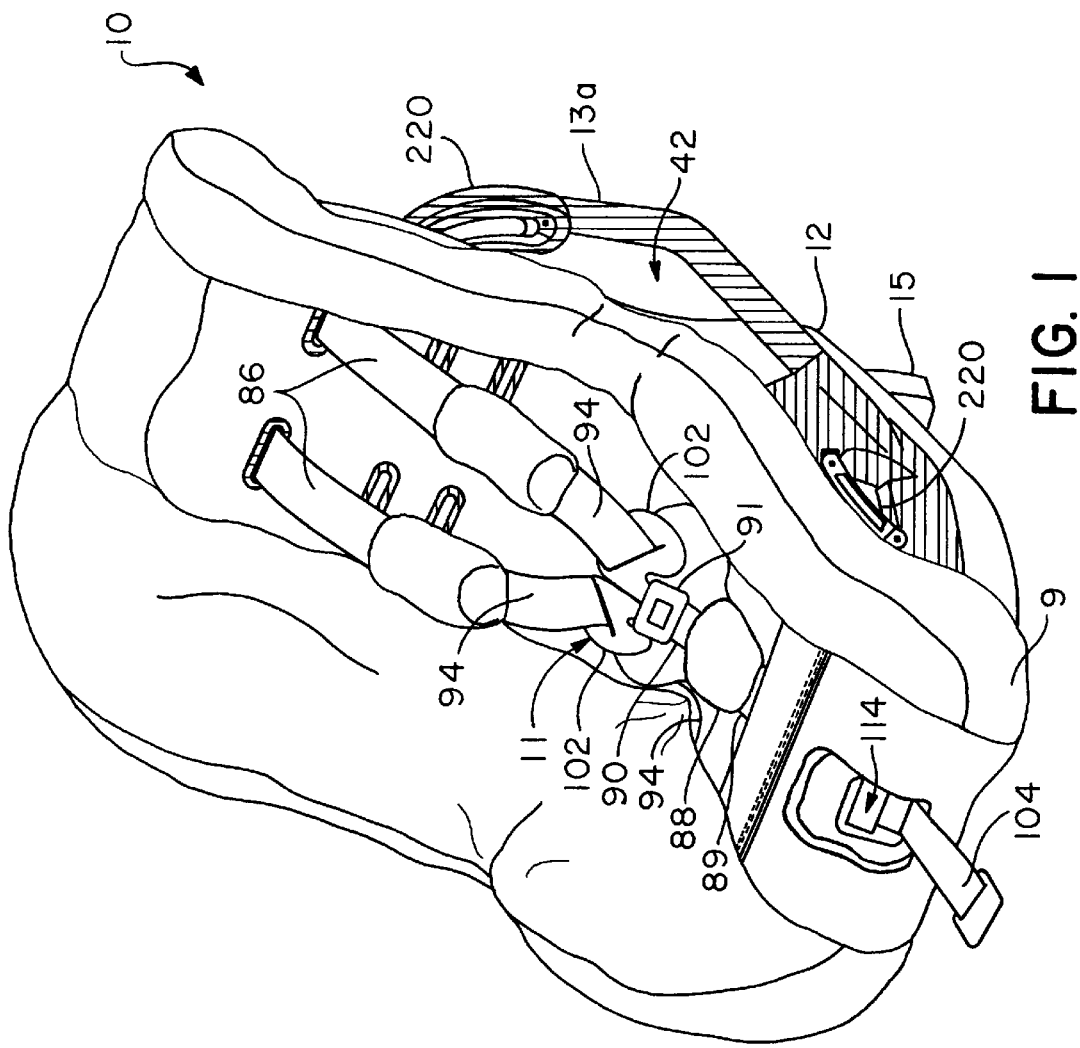
FIG. 1 is a front perspective view of the child car seat constructed in accordance with the principles of the present invention.
Figure 2:
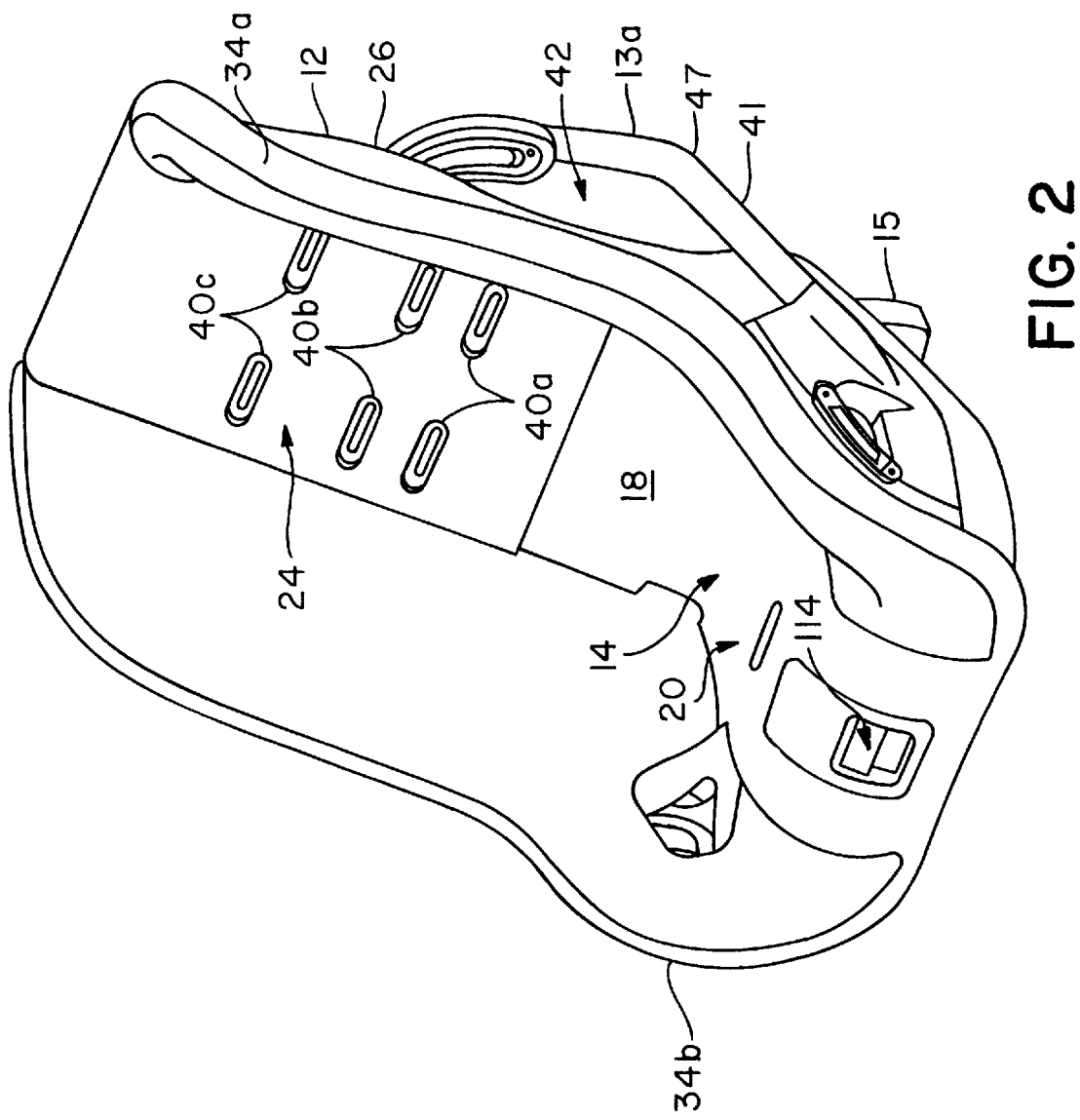
FIG. 2 is a view similar to FIG. 1 with the seat cover removed.
Figure 3:
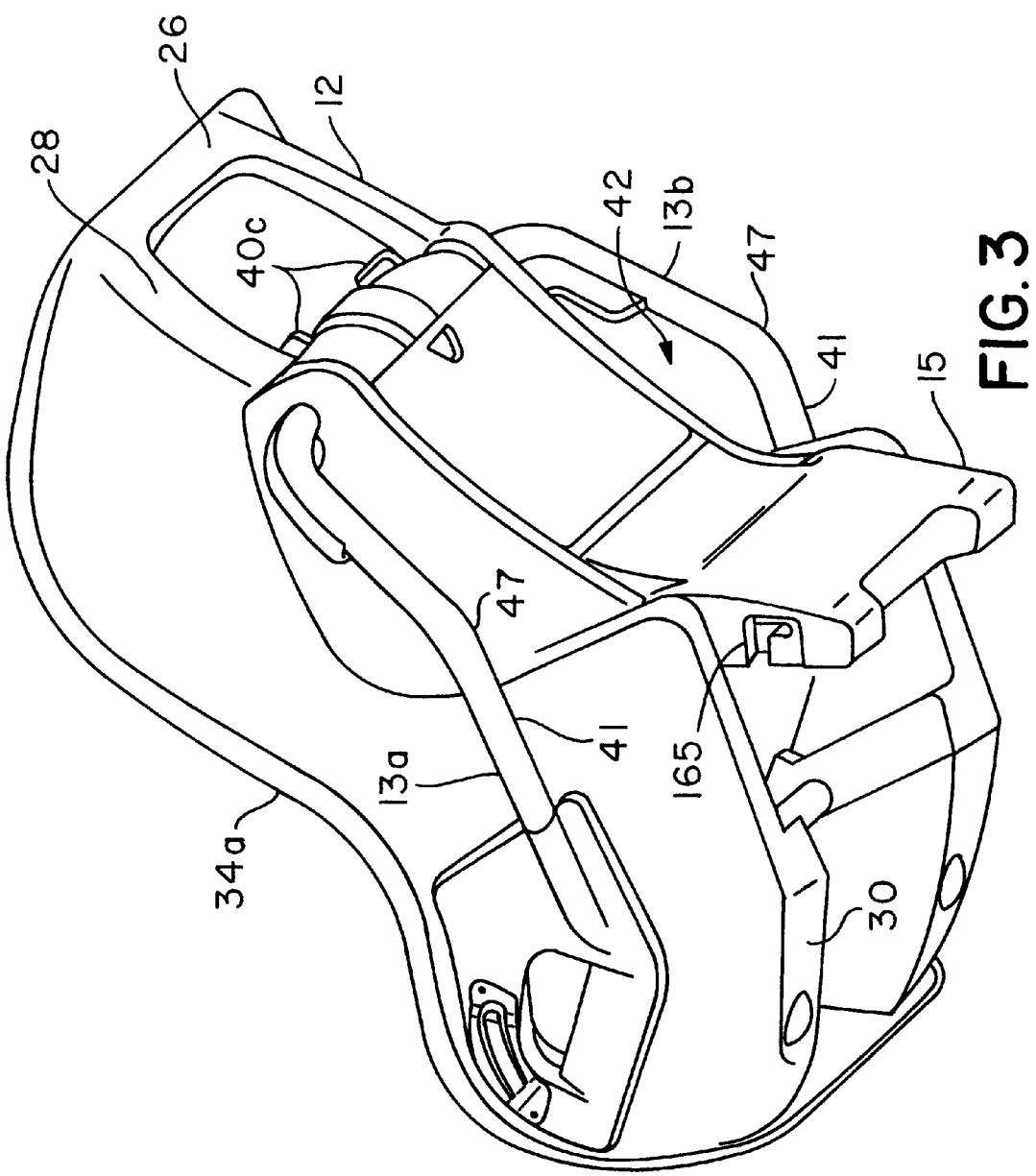
FIG. 3 is a rear perspective view of the child car seat of FIG. 2 with a rear leg in an extended position.
Figure 4:
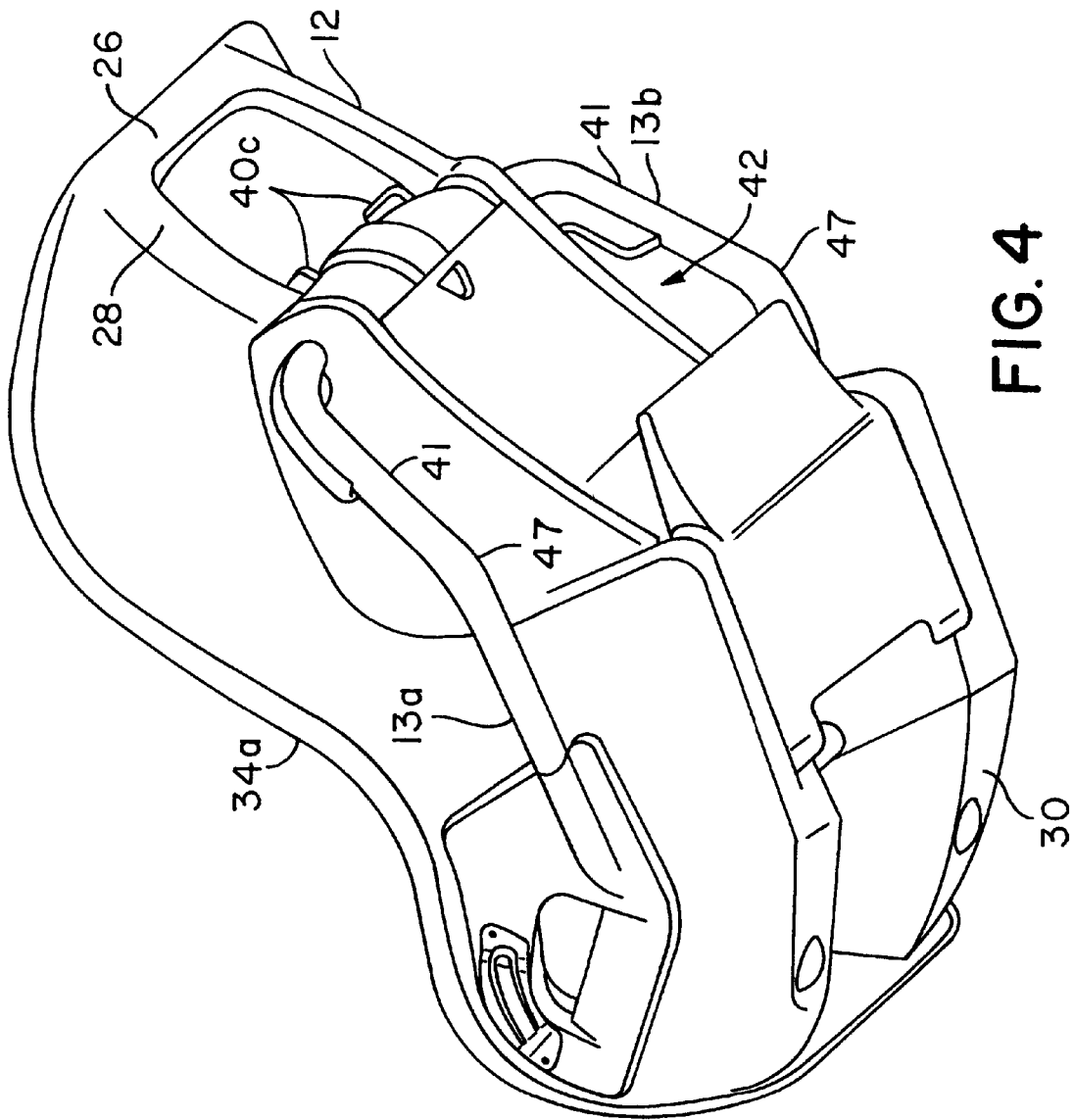
FIG. 4 is a rear perspective view of the child car seat of FIG. 2 with the rear leg in a retrated psition.

Reference will now be made in detail to presently preferred embodiments of the invention, examples of which are illustrated in the accompanying drawings. As depicted in FIGS. 1–5, a preferred embodiment of the child restraining system 10 of the present invention generally includes a unitary plastic shell or main body 12, a child restraint harness 11, a pair of tubes 13a, 13b, a rear leg or kickstand 15, and a flexible, washable, soft cushion 9.

The main body 12 has a generally arcuate or curved child support area 14 disposed on its upper or interior surface 18 to receive a child or infant in a sitting position. The child support area 14 of the main body 12 includes a lower seat portion 20 upon which a child may sit, and an upper back portion 24 for supporting the back of a child. The main body 12 also includes an exterior surface 26 adapted to contact the vehicle seating surface. In particular, the exterior surface 26 of the main body 12 includes an exterior upper back portion 28 adapted to contact the vehicle seat back and a lower base portion 30 adapted to contact the vehicle seat bottom or seat pan. The main seat body 12 also includes a pair of laterally-spaced sidewalls 34a, 34b to prevent a child seated therein from excessive lateral movement. The main body 12 and the cushion 9 may have one or more slots or grommets 40 therethrough to accommodate harness adjustment fixtures. The edges of the slots or grommets 40 in the main body 12, as well as the corresponding slots or grommets 40 in the cushion 9, are formed to provide rounded surfaces to prevent fraying or damage to the integrity of the cushion or harness and provide a smooth uninhibited belt flow. A unitary plastic main body having an energy absorbing foam insert is preferred, but the main body may comprise two or more pieces and may be constructed of any suitable material without departing from the scope of the invention.

A preferred embodiment includes a continuous loop of steel tubing 13 having two substantially horizontal transverse portions 45, 47 and two substantially downwardly and forwardly extending side portions 41. The side portions 41 include a bend 17 to conform generally to the shape of the seat. The transverse portions 45, 47 extend through the sidewalls 34a, 34b and are securely attached to, or fitted through, the upper and lower portions of the seat. The upper transverse portion 45 provides strength and support to the seat. The lower transverse portion 47 provides support and structural integrity and also provides a place to securely mount the child restraint harness 11.

The downwardly extending tube portions 41 preferably extend diagonally downward along the sides of the seat 10, toward a front lower portion of the seat, and are at a spaced relationship thereto, thus creating a passageway 42 between the tubes 13 and the sidewalls 34 of the seat 10. In the preferred embodiment, the middle portion of the side walls 34 or that portion located beneath the tubes 13 is cut away to allow a more rounded transition from the side wall 34 to the rear of the back support and allow greater access by a hand or arm for easier installation.

Figure 5:
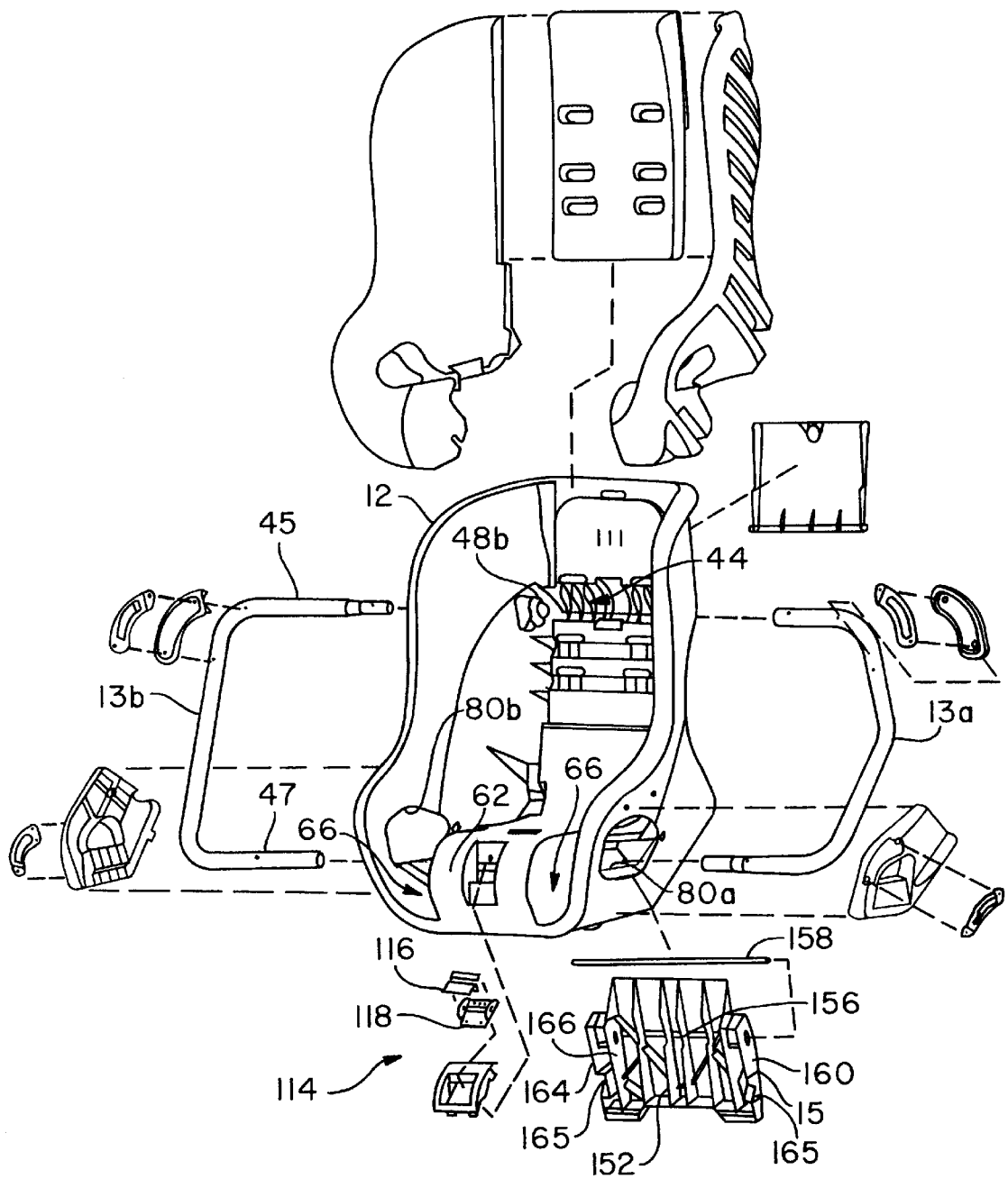
FIG. 5 is a exploded perspective view of the child car seat of FIG. 2.
Figure 6:
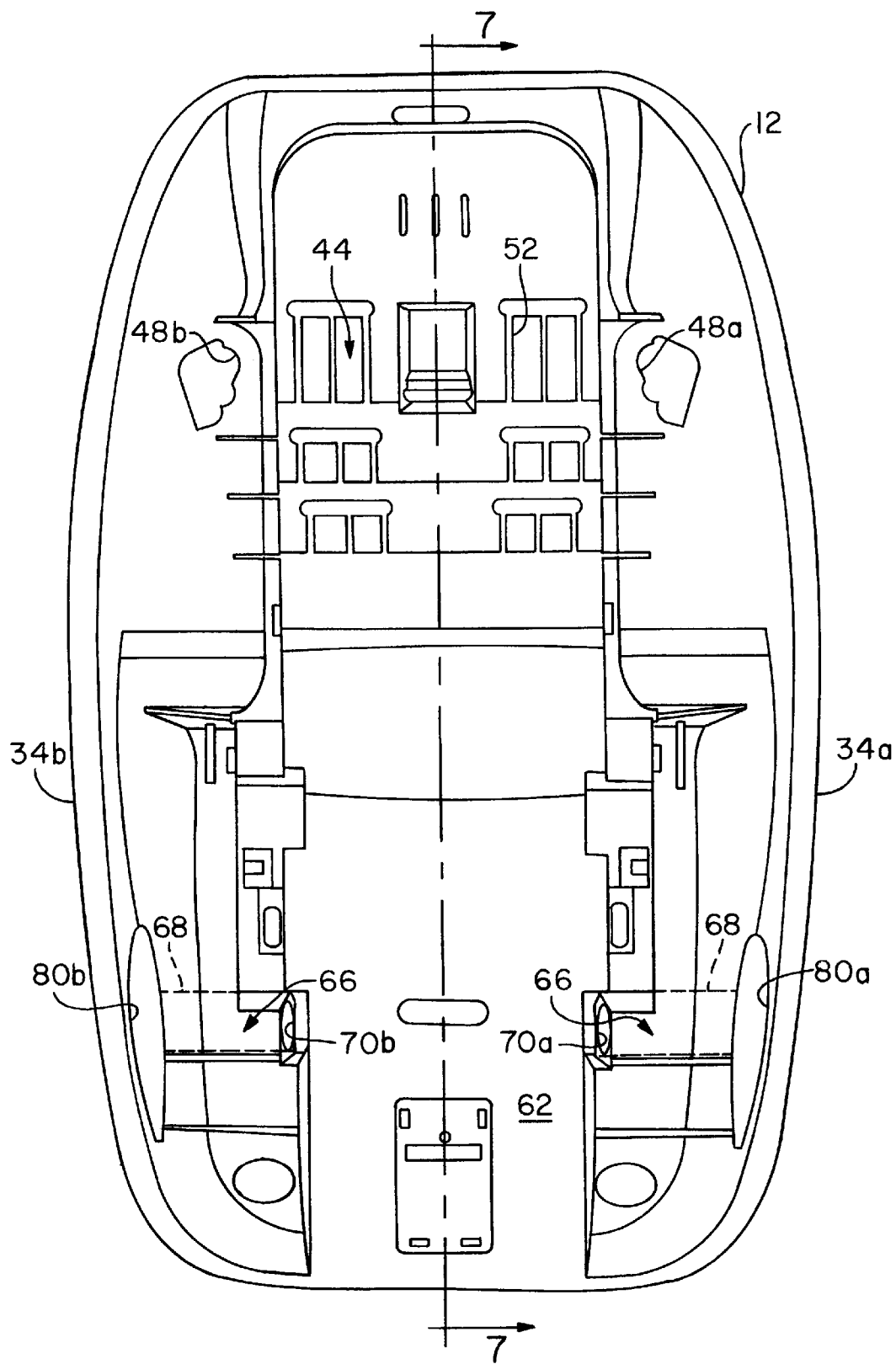
FIG. 6 is a plan view of the main body shell.
Figure 7:
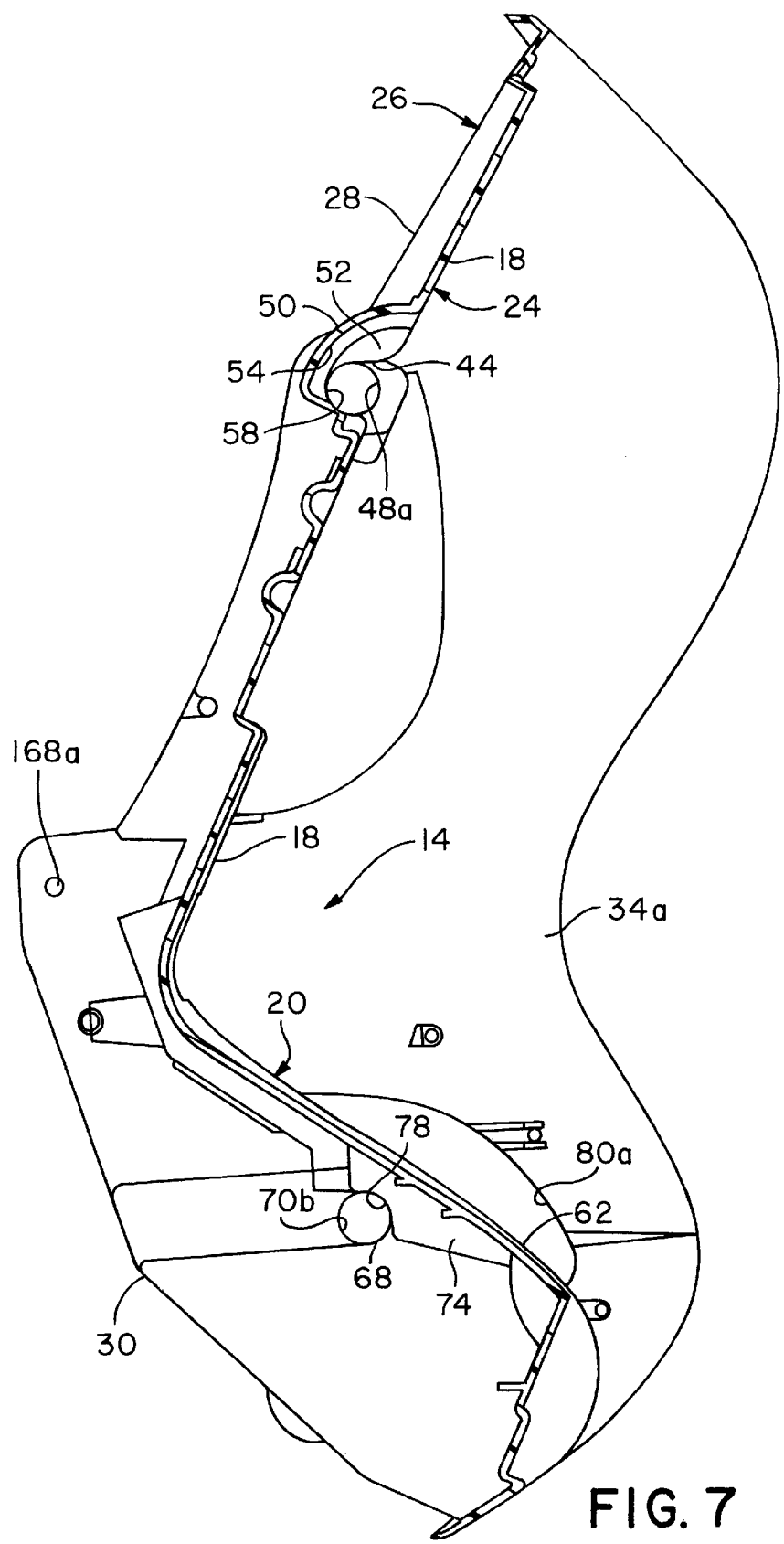
FIG. 7 is a section view taken along line 7—7 in FIG. 6.

As can be seen in FIGS. 5–7, a first transverse channel 44 extends across the upper back portion 24 terminating at apertures 48a, 48b formed in the sidewalls 34a, 34b adjacent the upper back portion 24. The first channel 44 is defined by a curved back wall 50 extending rearwardly from the child support area 14 and a plurality of parallel ribs 52 extending from the inside surface 54 of the back wall 50 toward child support area 14. Each rib 52 includes a notch 58 that is aligned with and conforms to a portion of each aperture 48a, 48b. Operatively, the upper transverse member 45 of the tubes 13 rests against the notch 58 of each rib 52 and extends through the apertures 48a, 48b where it joins the side portions 41 of the tubes 13. At the same time, the first channel 44 is deep enough so that the upper transverse member 45 rests against the notches 58 but does not break the plane of the inside surface 18 of the upper back portion 24.

Figure 8:
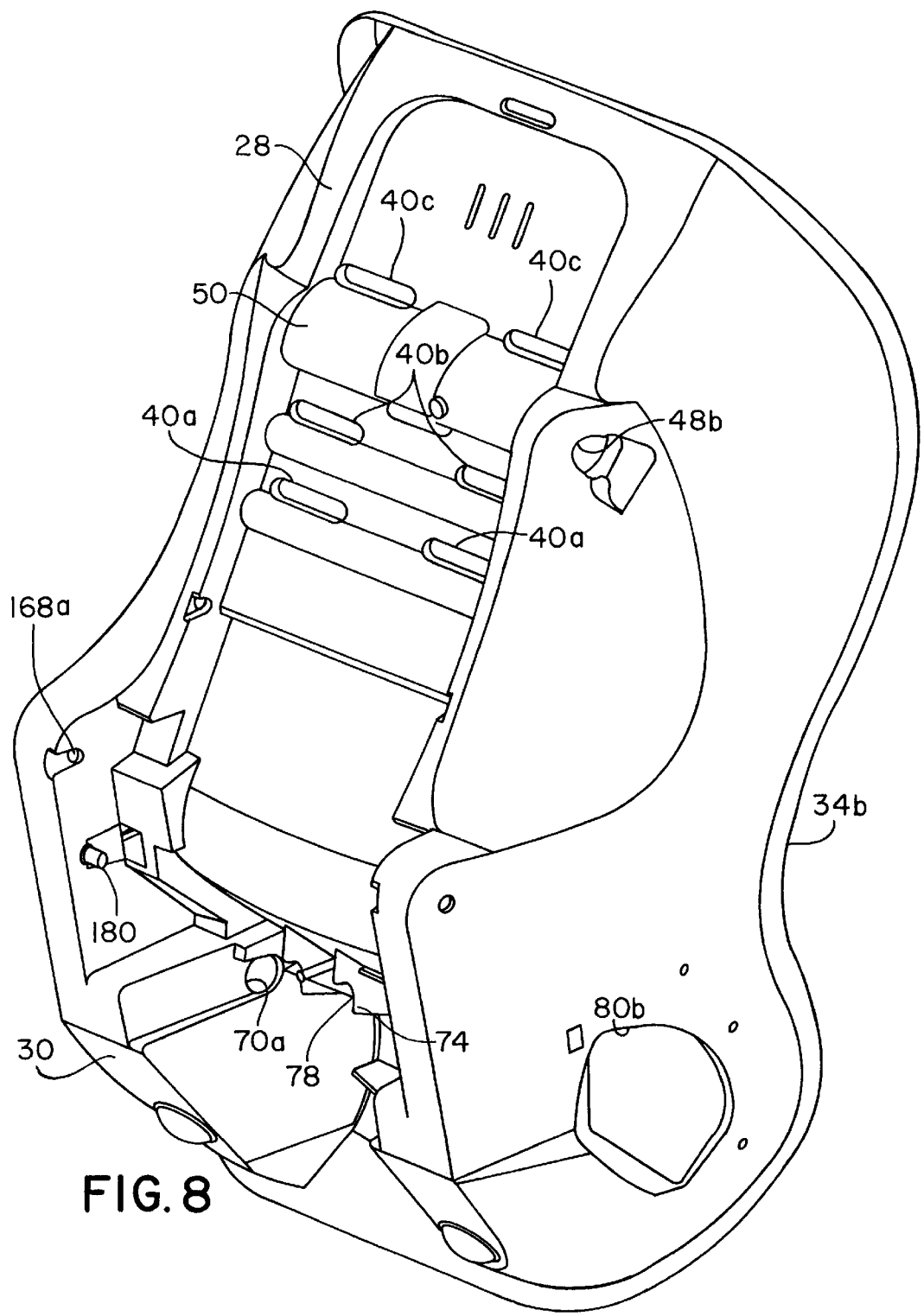
FIG. 8 is a rear perspective view of the shell of FIG. 6.
Figure 9:
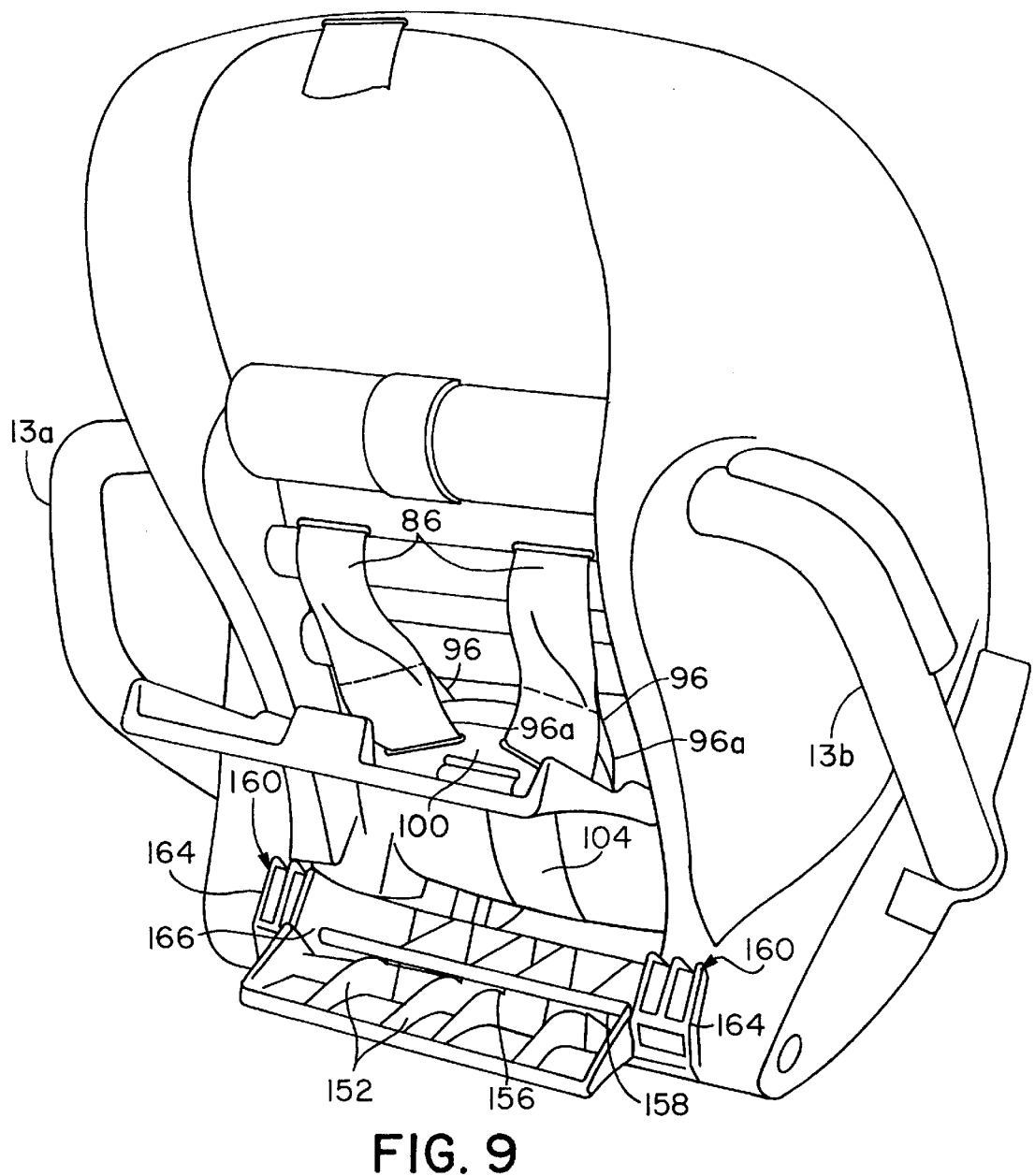
FIG. 9 is a rear perspective view of the shell of FIG. 6 showing a portion of the child restraint harness attachment.
Figure 10:
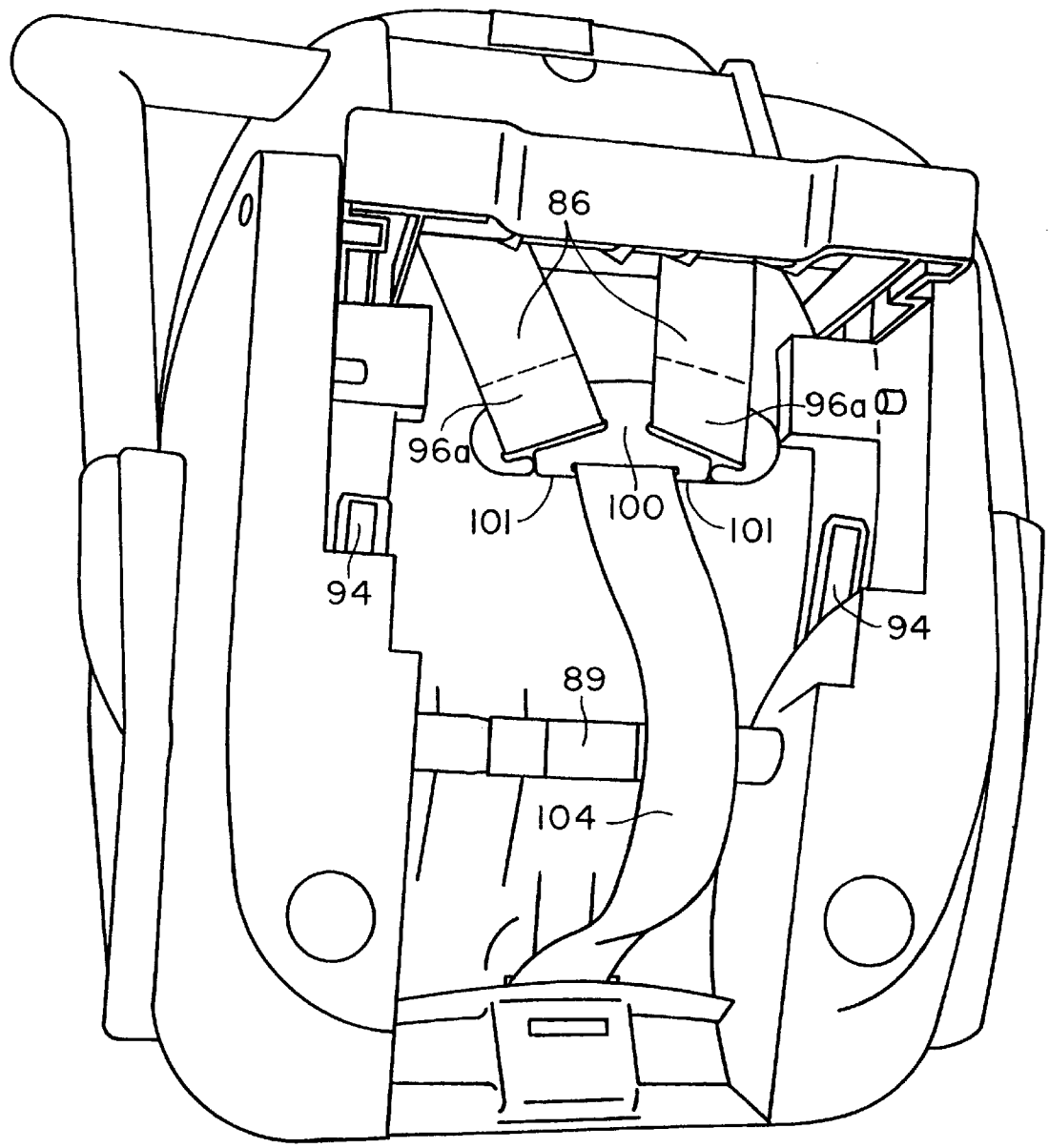
FIG. 10 is a bottom view of the shell of FIG. 6 showing a portion of the child restraint harness attachment.
Figure 11:
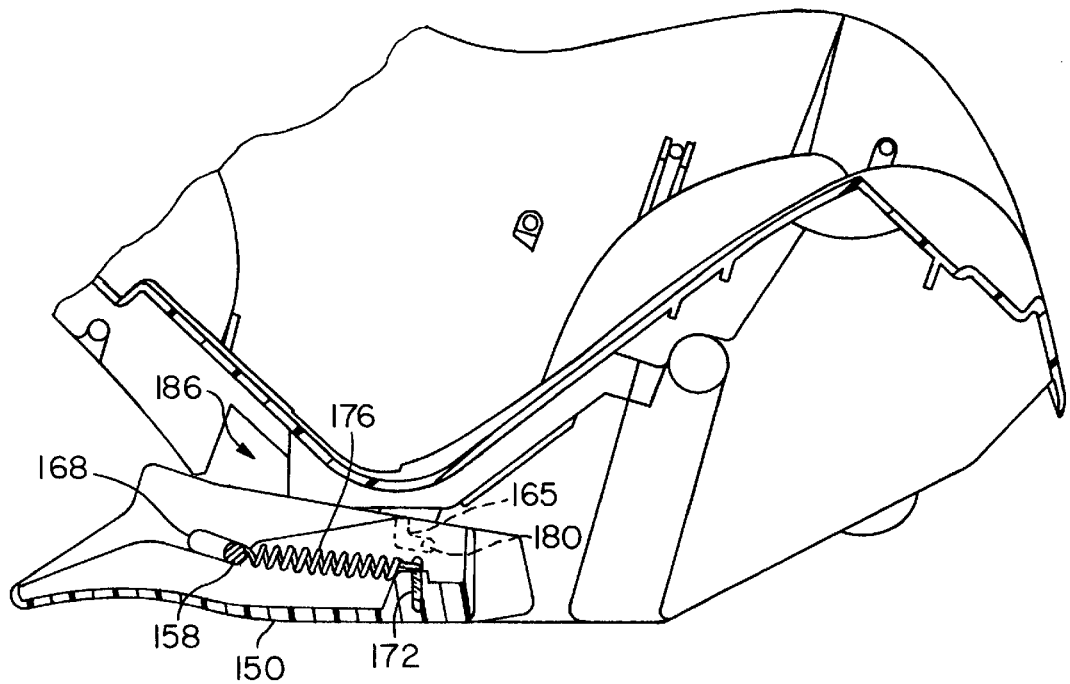
FIG. 11 is a partial section view of the seat shell and rear leg showing the rear leg in the retracted position.
Figure 12:
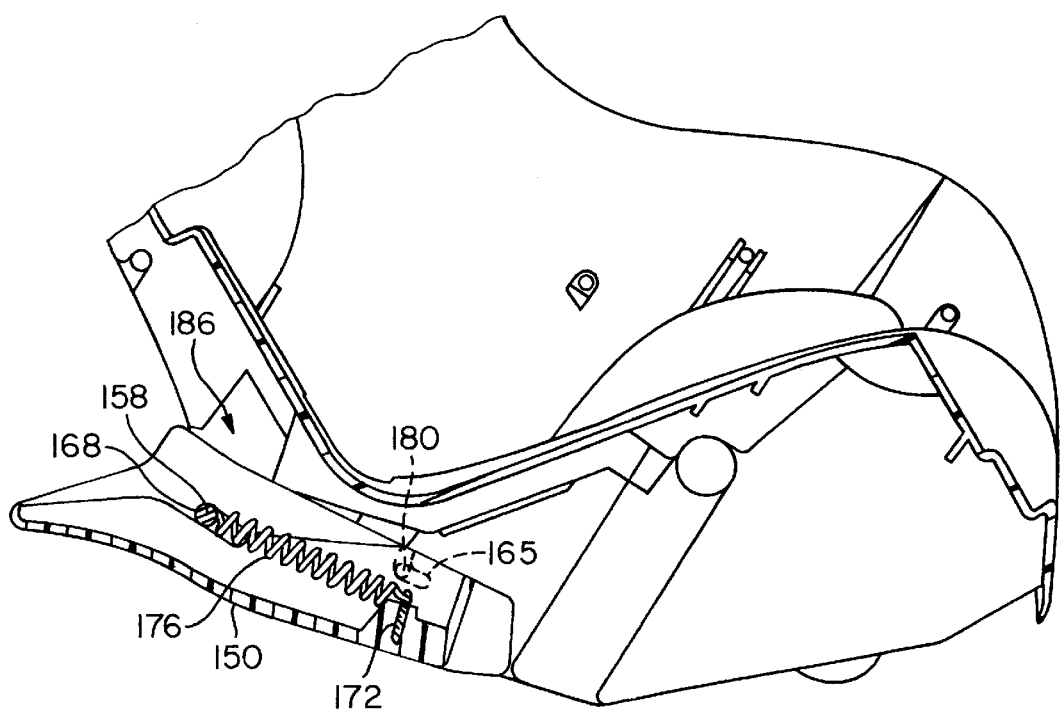
FIG. 12 is a partial section view of the seat shell and rear leg showing the rear leg at an intermediate position between the retracted and extended positions.
Figure 13:
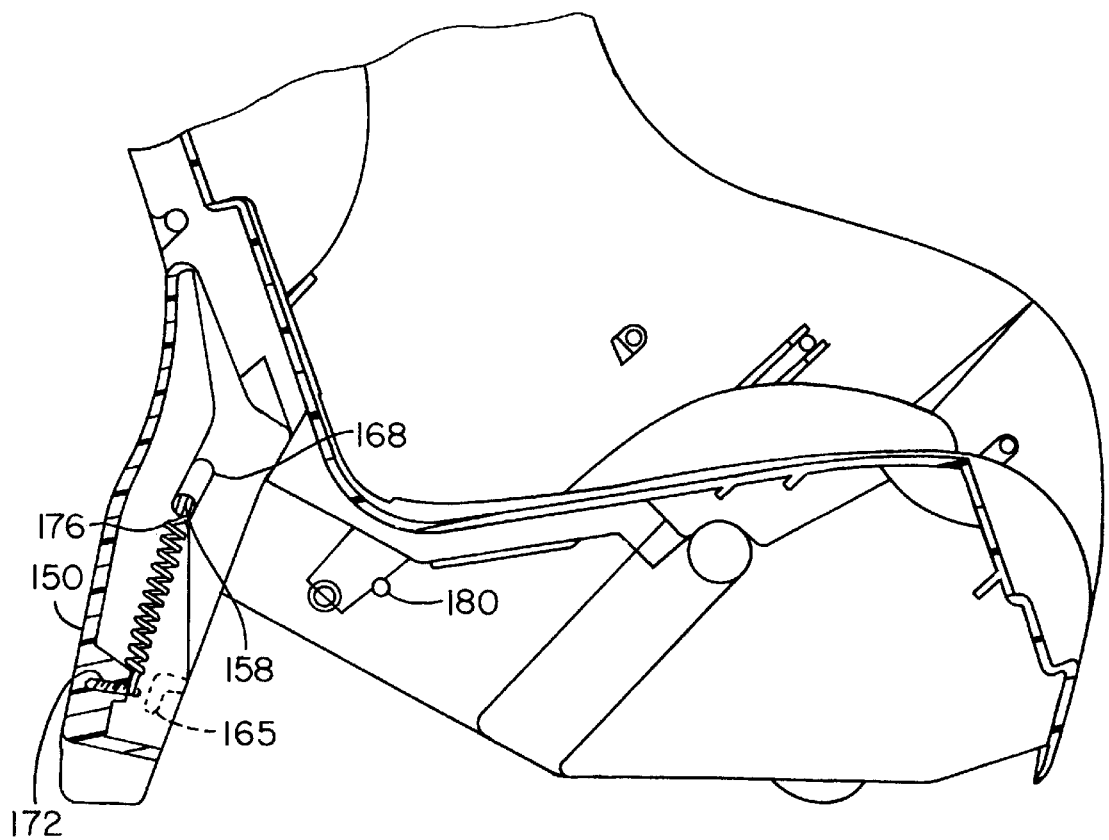
FIG. 13 is a partial section view of the seat shell and rear leg showing the rear leg in the extended position.

The lower base portion 30 includes a curved seating surface 62 that extends partially across the base portion 30 between the sidewalls 48a, 48b. A foam-receiving recess 66 is disposed between the lateral edges of the seating surface 62 and the sidewalls 34a, 34b. A second transverse channel 68 extends beneath the seating surface 62, as illustrated in FIG. 8, terminating at apertures 70a, 70b that open into the foam-receiving recesses 66. The second channel 68 is partially defined by a plurality of stiffening ribs 74 extending downwardly from lower base portion 30. Each rib 74 includes a notch 78 that is aligned with and conforms to a portion of the apertures 70a, 70b so that the lower transverse portion 47 of the tube 13 extending between the apertures 70a, 70b rests against the ribs 74 at the notches 78. A virtual second channel 68 (shown in dotted lines in FIG. 6) extends through the foam-receiving recess 66 to apertures 80a, 80b formed the sidewalls 34a, 34b adjacent the lower seat portion 20. The lower transverse portion 47 extends through the virtual second channel 68 and the apertures 80a, 80b to join the side portions 41 of the tubes 13.

The child restraint harness 11 is coupled to the car seat 10 to restrain a child in the child support area 14. In preferred embodiments, the child restraint harness 11 includes a pair of shoulder straps 86 coupled to a crotch strap 88. The shoulder straps 86 are preferably attached to the crotch strap 88 by means of buckles and latch plates, but any other suitable mechanism can be used. In preferred embodiments, the crotch strap 88 includes a first end 89 anchored to the lower transverse portion 47 of the tubes 13 and a free second end 90 attached to a buckle 91. Each shoulder strap 86 includes a first end 94 attached to the lower seat portion 20 adjacent the sidewalls 34a, 34b and a second end 96 that is turned back on itself and stitched to itself to form a loop 96a. The loop 96a is passed through one of the grommets, 40a for example, and coupled to a three way connector 100 adjacent the exterior upper back portion 28. For ease of adjusting the shoulder height of the shoulder straps 86, the three-way connector includes a pair of colinear fingers 101 for removably receiving the loops 96a. A latch plate 102 is slidably coupled to the shoulder strap 86 for movement along the shoulder strap 86 and configured to engage the buckle 91 attached to the crotch stap 88. Thus, the shoulder straps 86 and crotch strap 88 cooperate to provide a five-point child restraint to retain the child in the child support area 14. A tensioning strap 104 is permanently attached to the three way connector 100 to lock the shoulder straps 86 in position.

A spring loaded shoulder belt release 114 is disposed in the aperture 64 for receiving the tensioning strap 104 to retain the shoulder straps 86 is a desired position. The tensioning strap 104 is pulled through the belt release 114 until a desired amount of tension is applied to the shoulder straps 86, whereupon a spring loaded lever bar 116 pivots about an axis to pinch the shoulder strap against a stationary bar 118 to retain the shoulder strap 86. To release the tension and relocate the shoulder straps 86, the user pushes on the lever bar 116 to pivot the lever bar 116 away from the stationary bar 118 to allow the shoulder strap 86 to freely move relative to the belt release 114. Once the tensioning strap 104 has been released, the shoulder straps 86 can be released from connector 100 and withdrawn through the grommet 40a. Another pair of grommets, 40b for example, is selected to position the shoulder straps 86 against the child's shoulder, and the shoulder straps 86 are passed through the grommets 40b and re-attached to the connector 100. The tensioning strap 104 is pulled enough to provide a snug fit between the shoulder straps 86 and the child.

As shown in FIGS. 3–4 and 14–15, the preferred embodiment of the car seat 10 further includes a pivotally attached rear leg or kickstand 15 which functions as a seat recline adjuster. In the forward facing orientation, the rear leg 15 is pivoted out such that a distal end extends away from the seat body 12 and into the vehicle seat and thereby provide proper positioning and a more secure fit. The extended position of the rear leg 15 allows the seat to have a more upright, as opposed to a more reclined position, which is preferable for a toddler or young child who is more alert and active. In the rearward facing orientation, the rear leg 15 is pivoted to retract into or below the main seat body 12 so that the child seat assumes a more reclined position, which is preferable for an infant who does not generally have adequate muscle strength to hold up his/her head. Similar to the seat body, the rear leg 15 is preferably constructed of plastic, but can be made of any suitably strong and sturdy material. Although a one-piece leg is preferable, multiple legs are also contemplated.

A preferred rear leg 15 is generally rectangular and includes an outer wall 150 and a plurality of parallel strengthening walls 152 depending from the outer wall 150. Each strengthening wall 152 includes a notch 156 for receiving a hinge pin 158. Additionally, a seat engaging portion 160 extends outwardly from each side of the rear leg 15 and downwardly from the outer wall 150. Each seat engaging portion 160 includes outer and inner walls 164, 166 that are disposed in parallel relation with the strengthening walls 152 and with each other. Each outer wall 164 includes a notch 165 for engaging the leg 15.

The walls 164, 166 include elongated apertures 168 that are aligned with, and cooperate with, the notches 156 to form a hinge pin receiving channel 170. The hinge pin 158 is disposed in the channel 170 and extends through the elongated apertures 168 and beyond the seat engaging portions 160 to engage the lower base portion 30. A spring retaining boss 172 is disposed perpendicular to the hinge pin 158 at a point midway between the seat engaging portions 160, extending between and engaging two of the strengthening walls 152. A spring 176 extends between the hinge pin 158 and the retaining boss 172 to urge the hinge pin 158 toward one end of the elongated apertures 168.

The rear leg 15 is secured to the lower base portion 30 of the exterior seat body by the hinge pin 158. The pin 158 extends through the apertures 168 and engages apertures 168a formed in the lower base portion 30. The spring 176 allows the leg 15 to be selectively retained in either the extended or retracted positions. To secure the leg 15 in the seat's rearward facing orientation, the pair of notches 165 on the sides of the seat engaging portions 160 engage a pair of bosses 180 on the lower base portion 30. The spring 176 pulls the leg 15 rearwardly to urge the bosses 180 into the notches 165 and hold the leg 15 in place. To secure the leg 15 in the seat's forward facing orientation, the leg 15 is pulled toward the front of the car seat 10 to disengage the bosses 180 from the notches 165, and the leg 15 is pivoted about the hinge pin 158 to the extended position. The spring 176 urges the seat engaging portions 160 into a leg-receiving channel 186 formed in the lower base portion 30 that serves to hold the leg 15 in the extended position by preventing the leg 15 from pivoting about the hinge pin 158. Although a spring-notch/boss adjustment mechanism is preferred, any means for adjusting and holding the leg 15 in place is contemplated.

Figure 18A:
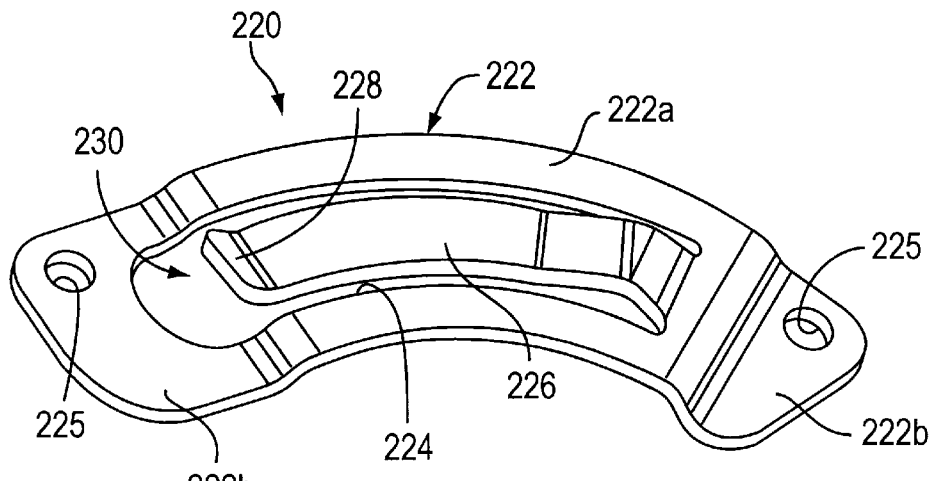
FIGS. 18a–18b are front and rear perspective views, respectively, of a clip for retaining the shoulder strap portion of a vehicle seat belt.
Figure 18B:
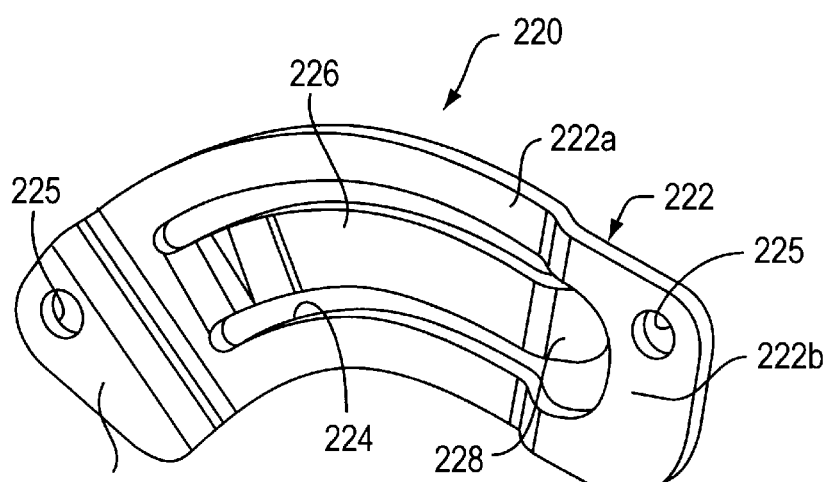
Figure 18C:
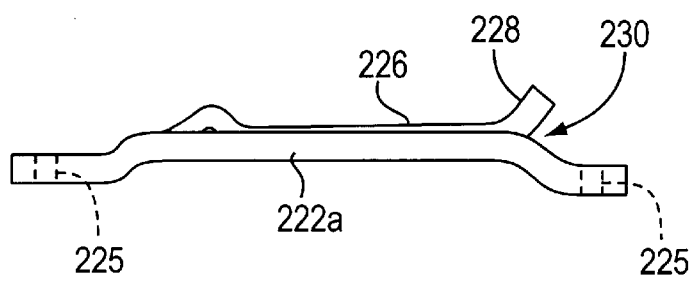
FIG. 18c is a side view of the clip.

The preferred embodiment of the car seat 10 includes a plurality of clips 220, illustrated in FIGS. 18a–18b, for retaining the shoulder strap portion 210a of the vehicle seat belt 210. The clips 220 are preferably attached to the car seat 10 at points adjacent the apertures 80a, 80b and at the top of the tubes 13a, 13b adjacent the point where the upper transverse portion 45 meets the downwardly extending tube portions 41 as shown in FIGS. 14–15.

The clips 220 include a curved plate 222 having a raised central portion 222a disposed between and above end portions 222b. The raised central portion 222a includes an elongated curved aperture 224 and a resilient central finger 226 extending into the elongated aperture 224. The finger 226 is elevated relative to the plane of the raised central portion 222a and away from the end portions 222b, with a distal end 228 bent upwardly away from the central portion 222a. Preferably, the finger's distal end 228 bends upwardly where the central portion 222a rises from the end portion 222b, providing a wide, generally V-shaped opening 230 between the finger's distal end 228 and the end portion 222b. In operation, the shoulder strap portion 210a of the vehicle seat belt 210 is inserted into the V-shaped opening 230 and pulled into the slot formed between the finger 226 and the plate 222, as illustrated in FIGS. 14–15. The resiliency of the finger 226 pinches the shoulder strap portion 210a between the finger 226 and the edges of the aperture 224 to hold the shoulder strap portion 210a in place.

The end portions 222b of the clips 220 can include fastener-receiving apertures 225 for fastening the clip 220 to the car seat 10. Alternatively, the clips 220 can be attached to the car seat 10 by adhesive, bonding agents, or other suitable attachment means for rigidly attaching the clip 220 to the car seat 10.

Figure 14:
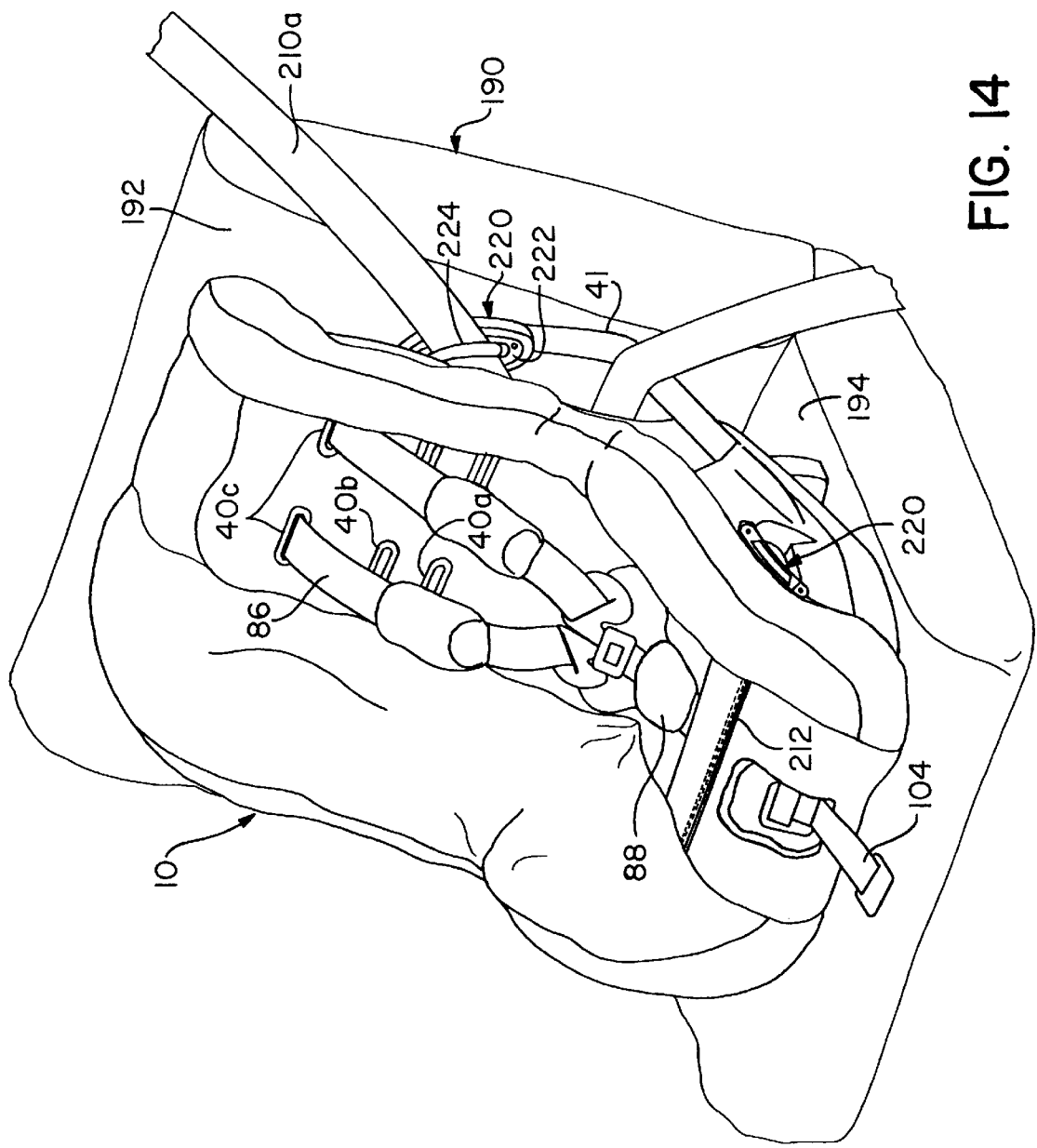
FIG. 14 is a perspective view illustrating the coupling of the child car seat in a forward-facing orientation with a three point seat belt system in a vehicle.
Figure 15:
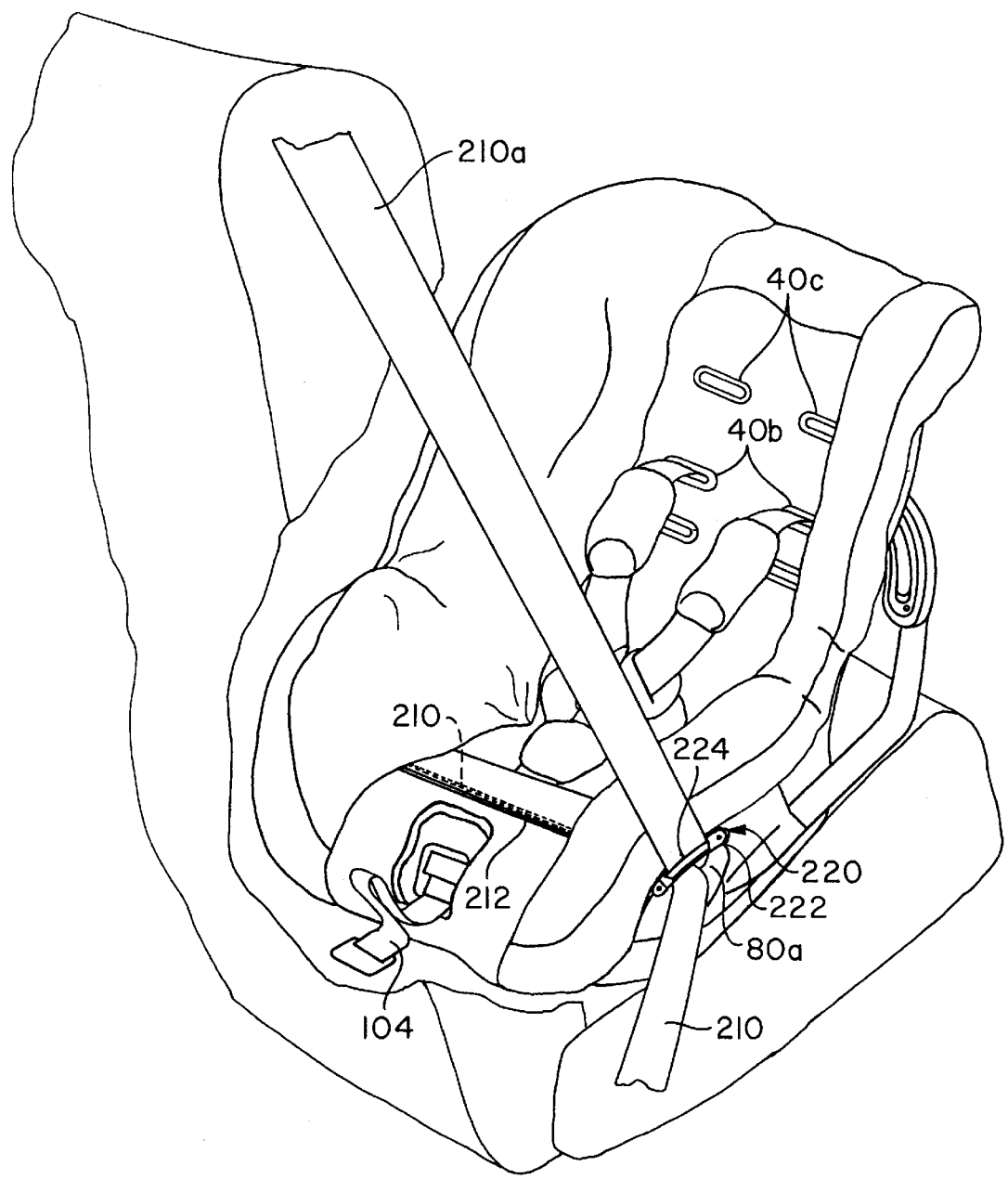
FIG. 15 is a perspective view illustrating the coupling of the child car seat in a rear-facing orientation with a three-point seat belt system in a vehicle.

As can be seen in FIGS. 14–15, the car seat 10 is adapted to be positioned upon a vehicle seat 190, in either a rearward facing or forward facing orientation. In the forward facing orientation, the exterior upper back portion 28 contacts the generally vertical back support surface 192 of the vehicle seat, and the lower base portion 30, contacts the vehicle seat bottom 194 or pan.

Figure 16:
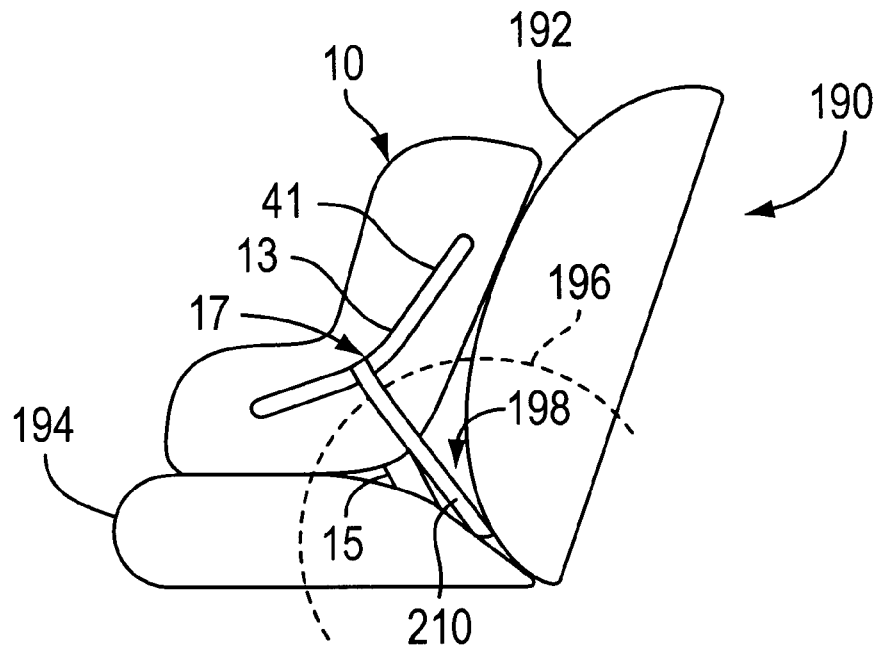
FIG. 16 is a side view of the seat in a forward facing orientation.
Figure 17:
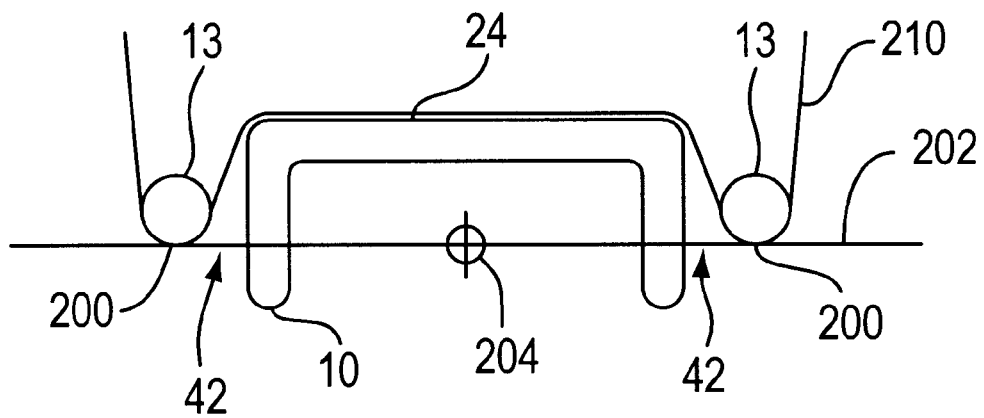
FIG. 17 is a schematic representation of the vehicle seat belt pathway for the forward facing orientation.

When the car seat 10 is in the forward facing orientation, as illustrated in FIG. 16, the downwardly extending tube portions 41 of the tubes 13 are disposed outside an eight inch radius 196 measured from the bight 198 of the vehicle seat, thereby providing vehicle seat belt entry points 200 that comply with the SAE Standard J1819. Conventional child car seats, on the other hand, often have entry points for the vehicle seat belt that lie within the eight inch radius. Typically, the vehicle seat belt takes one bend to enter in behind or underneath the seat and one bend to exit from behind or underneath the seat. However, if the anchor or buckle that receives the vehicle seat belt is forward of (or higher than) the point where the seat belt exits the car seat, the vehicle seat belt cannot securely hold the car seat to the vehicle. Thus, unlike conventional car seats, the placement of the tubes 13 permits the vehicle seat belt to adequately secure the car seat 10 of the invention to the vehicle regardless of the position of the anchor or buckle. In addition, to providing a superior fit in many vehicles, this entry point specifically allows the seat to be highly compatible with vehicles having the forward- or high-anchor seat belt configuration found in some newer model vehicles.

The preferred embodiment of the child car seat of the present invention is a convertible car seat, i.e., a car seat designed to be used in a vehicle in either a forward facing (toddler) orientation, illustrated in FIG. 14, or a rearward facing (infant) orientation, illustrated in FIG. 15. The vehicle belt pathway for the seat's rearward facing orientation differs from the belt pathway appropriate for its forward facing orientation. Specifically, in the rearward facing orientation, as illustrated in FIG. 15, the vehicle seat belt 210 is passed up through one of the openings 80a, 80b in the sidewalls 34a, 34b of the seat, over the seating surface 62 and down through the opening on the opposite fsidewall 34a, 34b. In preferred embodiments, the seat belt 210 passes under a flap 212 formed in the seat pad 9. In the rearward facing orientation, the rear leg 15 is rotated up and in under the main seat body 12 such that the seat assumes a more reclined position.

In the forward facing orientation, illustrated in FIGS. 14 and 16, the vehicle seat belt pathway extends from the vehicle seat 190 partially around one of the tubes 13, preferably just below the bend 17, through the adjacent passageway 42 and behind the upper back portion 24, through the opposite passageway 42 and then partially around the other tube 13 to engage a buckle portion of the vehicle seat belt. Preferably, the entry points 200 are disposed along a line 202 that passes through, or near, the center of gravity 204 of the child seated in the car seat. This placement of the entry points 200 reduces pitching moments applied to the car seat during an impact. Also, the bend 17 is preferably positioned on the tubes 13 so that the vehicle seat belt 210 extends at about a 45 degree angle from the bight 198 when engaging the tubes 13 just below the bend 17. In the forward facing orientation, the rear leg 15 is rotated down and outwardly from the bottom of the seat 10 to extend into the bight 198 of the vehicle seat 190.

In preferred embodiments, the car seat 10 includes a conventional top anchoring strap (not shown) that attaches to the upper transverse member 45 and passes through a slot formed in the shell 12 to attach to the vehicle. The top anchoring strap, when attached to the vehicle, prevents the car seat 10 from tipping over in the event of an impact.

Figure 19:
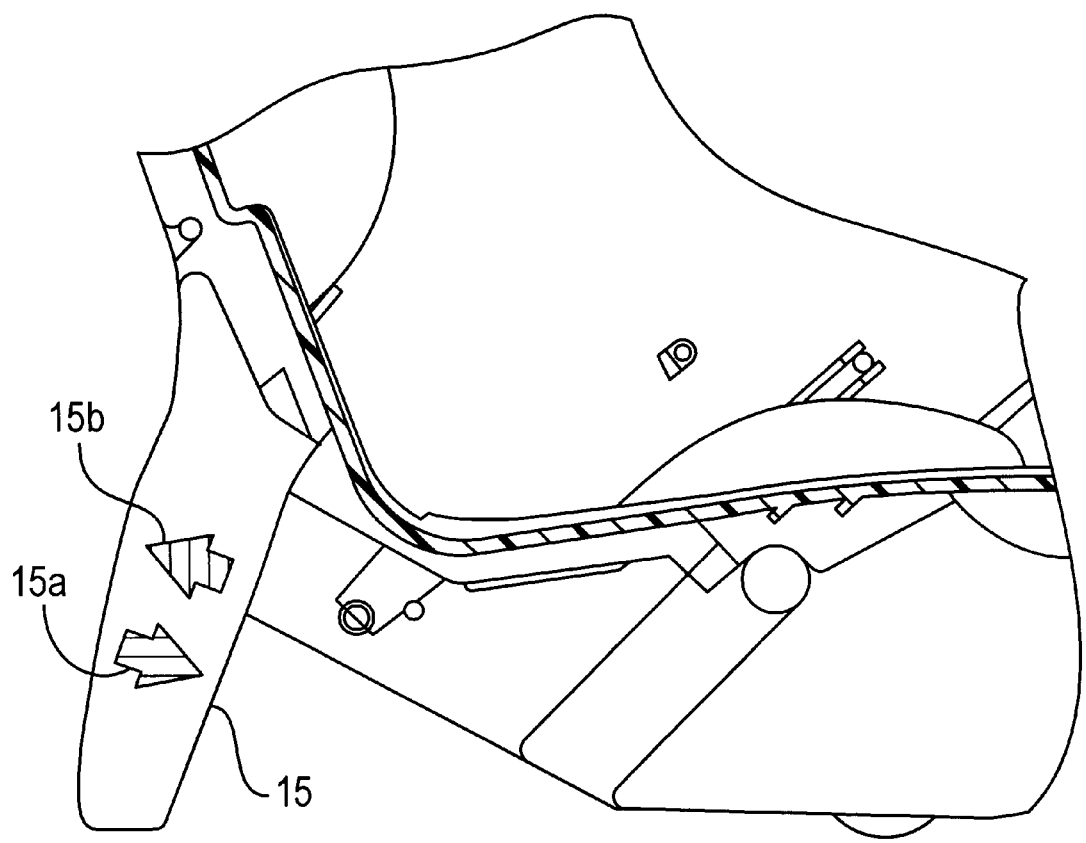
FIG. 19 is a view similar to FIG. 13 showing the rear leg in full with color coded arrows indicating retracted and extended positions.

In order to aid the parent or adults in correctly fitting the child car seat to the vehicle and to the child, the various adjustment positions, vehicle seat belt pathways, and the top anchor strap are similarly marked by any number of visual or tactile indicia, preferably, color-coding. Thus, the seat belt pathway, the top anchor strap, and all harness adjustment positions that are appropriate for the forward facing orientation are color-coded with the same color, while the belt pathway and harness adjustment positions appropriate to the rearward facing orientation are all color-coded with a second color that is visually distinct from the color used for the forward facing orientation. See, for example, FIGS. 1 and 19. In particular, the area surrounding the openings 80a, 80b in the sidewalls 34 of the seat, an arrow 15a (FIG. 19) indicating a retracted position for the rear leg 15, and the lower grommets 40a, 40b are all coated with, or manufactured from, appropriately colored materials such as blue polypropylene to indicate a rearward facing orientation suitable for an infant. Similarly, the adjustment positions and seat belt pathway for the front seat facing orientation, i.e., the tubes 13 or other structure providing the appropriate belt entry point, an arrow 15b indicating an extended position for the rear leg 15, and the upper grommets 40c are all coated with, or manufactured from, materials of a second, visually distinct color such as magenta polyproplylene. For the rear leg 15, the preferred indicia includes color coded arrows 15a, 15b on the sides of the rear leg 15, but any scheme that differentiates the retracted position from the extended position can be used.

While two colors may be used to indicate a infant/rearward facing orientation and a toddler/forward facing orientation, respectively, three or more colors could be used on the adjustment positions to indicate various weight and/or size ranges of the child. The features that only have two variables, i.e., the seat restraints for the belt pathways and the rear leg or seat recline adjuster, can be colored or marked to indicate that it can be used with one or more of the harness adjustment positions colors with, for example, striated color schemes.

Although color-coding is preferred, any visual or tactile system which clearly identifies and distinguishes the adjustments positions and seat belt placements is contemplated as being within the scope of this invention.

What is claimed is:

1. A child car seat for mounting in a passenger seat of a vehicle having a passenger restraint harness and capable of restraining in said car seat a child occupant ranging in size from an infant to a toddler, said car seat comprising:

a seat body having a child support surface disposed on an upper side thereof, said child support surface including a lower seat portion and an upper back portion;

a first seat restraint coupled to said seat body and engageable with the passenger restraint harness, when said car seat is disposed in the passenger seat, to restrain said car seat in the passenger seat in a first, rear-facing orientation appropriate for an infant;

a second seat restraint coupled to said seat body and engageable with the passenger restraint harness, when said car seat is disposed in the passenger seat, to restrain said car seat in the passenger seat in a second, forward-facing orientation appropriate for a toddler; and a child restraint harness coupled to said seat body and having a child restraining portion disposed adjacent said child support surface to restrain a child occupant of said car seat between said restraining portion and said child support surface, said restraining portion including a shoulder strap having an upper end, said back portion having disposed thereon an upper shoulder strap position and a lower shoulder strap position disposed between said upper shoulder strap position and said seat portion, said upper end of said shoulder strap being selectively engaged with said back portion at said upper shoulder strap position, at which position said child restraining portion is suitably positioned for use by a toddler, said upper end of said shoulder strap further being selectively engaged with said back portion at said lower shoulder strap position, at which position said child restraining portion is suitably positioned for use by an infant, and said upper shoulder strap position and said second seat restraint having associated therewith first and second visual indicia, respectively, and said lower shoulder strap position and said first seat restraint having associated therewith third and fourth visual indicia, respectively, said first and second visual indicia being visually similar to each other and said third and fourth visual indicia being visually similar to each other and visually distinct from said first and second visual indicia.

2. The car seat of claim 1, further comprising recline control means for selectively disposing said seat body in a first, upright position with respect to the passenger seat when said car seat is disposed in the passenger seat, said upright position being suitable for use with a toddler, or a second, reclined position with respect to the passenger seat suitable for use with an infant, said recline control means having associated therewith fifth and sixth visual indicia corresponding to said upright and reclined positions, respectively, said fifth visual indicium being visually similar to said first and second visual indicia and said sixth visual indicium being visually similar to said third and fourth visual indicia.

3. The car seat of claim 2 wherein said recline control means includes an elongate member pivotally coupled at a first end thereof to said seat body and pivotable between a first, extended position in which said elongate member extends away from said seat body and a second, retracted position in which said elongate member is disposed adjacent to said seat body.

4. The car seat of claim 3 wherein said first, second, and fifth visual indicia comprise a first color and said third, fourth, and sixth visual indicia comprise a second color.

5. The car seat of claim 4 wherein said fifth and sixth visual indicia comprise colored arrow icons disposed on said elongate member.

6. The car seat of claim 1, wherein said first and second visual indicia comprise a first color and said third and fourth visual indicia comprise a second color.

7. The car seat of claim 6 wherein:

said first seat restraint includes a first opening in said seat body in which the passenger restraint harness can be disposed when said car seat is disposed in the passenger seat and said fourth visual indicium comprises a portion of said seat body adjacent said first opening bearing said second color; and said second seat restraint includes a second opening in said seat body in which the passenger restraint harness can be disposed when said car seat is disposed in the passenger seat and said second visual indicium comprises a portion of said seat body adjacent said second opening bearing said first color.

8. The car seat of claim 6 wherein:

said first visual indicium comprises a first portion of said back portion adjacent said upper shoulder strap position bearing said first color; and said third visual indicium comprises a second portion of said back portion adjacent said lower shoulder strap position bearing said second color.

9. The car seat of claim 8 wherein each of said upper and lower shoulder strap positions includes an opening in said back portion with a grommet fitted therein and wherein said first and second portions of said back portions include said grommets.

* * * * *